Figures 1, 2:
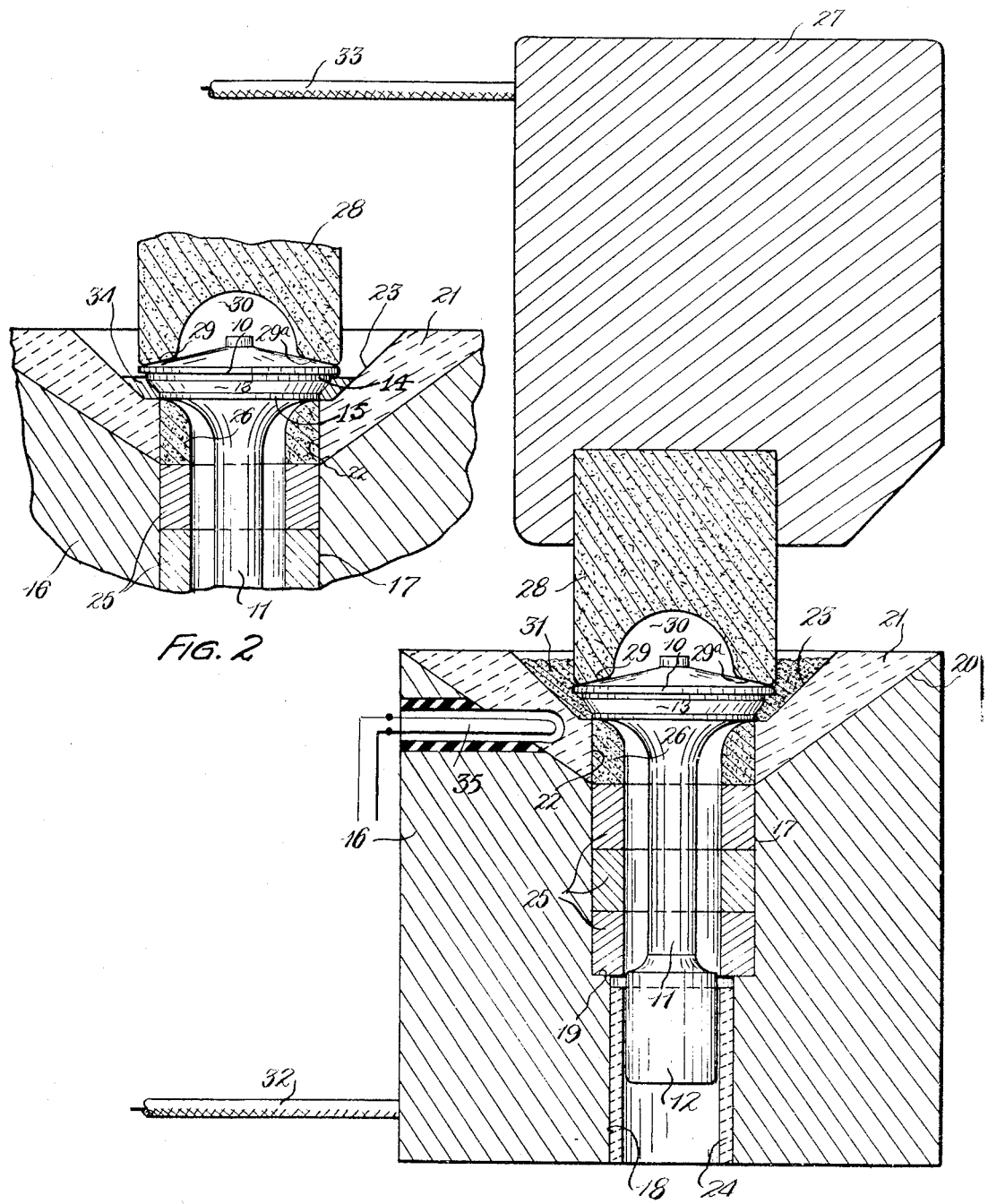

Sept. 12, 1944.   A. LONGORIA   2,358,090
PROCESS OF BONDING METALS
Filed Feb. 19, 1942

INVENTOR.
ANTONIO LONGORIA
BY Hull & West,
ATTORNEYS

Patented Sept. 12, 1944

2,358,090

UNITED STATES PATENT OFFICE 2,358,090

PROCESS OF BONDING METALS

Antonio Longoria, South Euclid, Ohio, assignor of one-half to Unit Rays, Inc., Cleveland, Ohio, a corporation of Ohio Application February 19, 1942, Serial No. 431,605

3 Claims. (Cl. 22—204)

This invention relates to a process of and apparatus for the bonding of metals, and more particularly to a process of and apparatus for bonding metals having different melting points. In my application Serial No. 429,556, filed February 4, 1942, I have shown an apparatus and have described and claimed the said apparatus and two allied processes for accomplishing the bonding of such metals—the particular embodiment of my invention shown and described in said application being applicable to the bonding of Stellite facings to the tapered or frustoconical peripheral seating portions of valves such as are used with airplane motors. It is the object of the invention set forth in the present application to accomplish the bonding of metals having different melting points by means of a method which, while efficient in operation and results realized thereby, differs from those described and claimed in the aforesaid application Ser. No. 429,556, the apparatus shown herein as employed for the accomplishment of such object being similar to that shown, described and claimed in the aforesaid application.

As has been pointed out in the specification of my earlier-filed application aforesaid, the heads of valves such as are used with airplane engines are made of an alloy steel, and the frustoconical peripheral seating portions of these valves are provided each with a facing of Stellite, which consists usually of an alloy of cobalt, chromium and tungsten, this alloy possessing the properties of being "hot hard" and of resistance to shock as by impact, as well as resistance to oxidation by the lead content of the high octane fuels employed in said engines. As has also been pointed out in my earlier application, the only method in commercial use for bonding Stellite to the seating portions of these valves is that which involves the employment of acetylene welding torches; and the practice of this method requires great care and skill, is trying upon the eyes of the operator, and is time-consuming. Furthermore, unless unusual precautions are taken, an undesirable proportion of the metal of the valve will migrate into the Stellite, producing a condition in the latter which is detrimental to enabling it to perform its intended function as a valve facing.

The general objects of my invention are to accomplish a great saving in time in the bonding of metals having different melting points and more particularly the bonding of Stellite to the tapered seating surfaces of valve bodies; also to accomplish this result without any material intermingling of the metals so bonded.

I accomplish the foregoing objects of my invention by means of the generic process and the specific processes set forth hereinafter and accomplished by the apparatus shown more or less schematically in the drawing appended hereto, wherein Fig. 1 represents one form of apparatus capable of realizing my invention, the said figure showing a vertical sectional view through the means for supporting and heating the valve and for forming a ring about the seating portion thereof by the use of Stellite in a divided condition, the valve being shown in elevation; and Fig. 2 a detail in sectional elevation of the valve head, mold, and electrodes shown in the preceding view, but wherein the Stellite employed is in the shape of a pre-formed ring of the same.

Describing by reference characters the parts shown in the drawing, 10 denotes generally the head of a valve, such as is employed with the engines of airplanes, and 11 the stem thereof, the said stem having an enlarged cylindrical lower end 12 and being also provided with a tapered or frustoconical seating portion 13, shoulders 14 and 15 being shown as provided respectively above and below the said seating portion. It will be understood that the drawing does not show the valve in the final machined condition which it will assume before it may be assembled into an engine. The surplus metal appearing thereon in various places facilitates the application of the Stellite facing thereto and the machining of said facing, as well as subsequent processing steps.

16 denotes a block of material possessing high electrical conductivity and incidentally high heat conductivity. The material which I prefer to use is copper, because it possesses high electrical conductivity. As will be noted, this block is of large cross-sectional area, whereby it is capable of carrying a heavy or high current without becoming unduly heated thereby; it is shown as provided with an upper cylindrical bore section 17 and a lower cylindrical bore section 18 constituting an extension of the upper section but being of less diameter than the same, there being an annular shoulder 19 interposed between the said bore sections.

The upper surface of the block 16 is formed into an inverted frustoconical seat 20, extending outwardly from the upper end of the bore section 17. This seat supports a mold 21 of refractory material which will not carburize the metal therewithin and which will not short-circuit the current. In practice, I have found lava rock suitable for making molds possessing the requisite qualities of being practically electrically non-conductive and of being incapable of carburizing molten metal in contact therewith. The mold is shown as provided with a bore 22 constituting an extension of the bore section 17. This bore 22 extends preferably upwardly as far as the bottom of the lower shoulder 15 of the valve head, the said bore being preferably of the same diameter as that of the shoulder. An annular mold cavity 23 is provided between the upper surface of the mold and the peripheral tapered portion of the valve head. The mold is shown as extending above the upper shoulder 14 of the valve body, thereby to provide ample space for the accommodation of the divided Stellite which, in the practice of my process, will be reduced to a molten condition, as well as to provide a space within the wall thereof above the tapered portion 13 of the valve head for the reception of impurities that may rise to the top of the molten metal. The mold 21 is interchangeable with others having inner walls differing therefrom and from one another in contour, in order to provide mold cavities 23 of suitable shape and extent to accommodate variations in the shapes or forms of the portions of the valve bodies with which they may respectively cooperate.

24 denotes a bushing of refractory material fitted within the lower bore section 18 and serving as a means for centering the lower end 12 of the valve stem and electrically insulating the latter from the block 16.

The shoulder 19 is shown as supporting a plurality of rings 25 of carbon possessing relatively high electrical resistivity and low heat conductivity, the said rings engaging the surrounding wall of the bore section 17. These rings extend upwardly as far as the bottom of the mold 21.

26 denotes an electrode in the form of a ring of carbon of high heat resistivity and somewhat lower specific electrical resistivity than the rings 25. The carbon which I prefer to use for this purpose is graphite. It will be noted that the ring 26 is fitted within the bore 22 of the mold and that its upper end is beveled outwardly from the interior thereof, whereby only a limited annular contact area is provided between the top of the ring and the lower shouldered portion 15 of the valve head, adjacent to the bottom of the surface of the tapered portion 13 of the latter. Due to this beveling of the graphite ring, its electrical resistance is greatly increased where it contacts with the valve head.

27 denotes an upper block, preferably of copper, having a large diameter whereby it is capable of carrying a heavy electrical current without being unduly heated thereby.

28 denotes an electrode which is mounted within a cavity provided therefor in the lower end of the block 27, the said electrode also being preferably of graphite, for purposes explained in connection with the electrode ring 26, and having its lower end formed into an external ring 29 surrounding a central cavity 30, said ring having a downwardly and outwardly beveled surface 29a which is adapted to engage the upper external portion of the valve head above the shoulder 14 and above the upper end of the surface of the tapered seating portion 13. The effect of beveling the lower end of the ring 29 is the same as that accomplished by beveling the upper end of the ring 26.

The electrodes 26 and 28 and the rings 25 are removable for purposes of renewal, reshaping and substitution.

The apparatus shown and thus far described was designed with special reference to solving the problems arising from bonding to the surface of a metal body having a relatively high melting or fusing point, a metal having a lower fusing or melting point, including the problem of preventing the detrimental intermingling of the two metals; and is shown as especially designed for applying a Stellite facing to the frustoconical portion of a valve such as is used with the engines of airplanes. As is known to those skilled in the art, the alloy from which the heads of the valves referred to herein are made has a melting point of approximately 2700° F. to 2800° F., while the Stellite has a melting point of approximately 2300° F. to 2400° F. Hence, it follows that the Stellite will assume a molten condition at a temperature considerably below that at which the surface of the tapered portion 13 can be brought to a suitably softened condition (below its actual melting point) to enable a proper bond to be formed between the Stellite and the valve head. Furthermore, in order to prevent the metal of the valve body from entering into the Stellite in a sufficient quantity to be detrimental to the desired qualities of the latter, it is necessary to effect a union between the Stellite and a very thin external, or skin, section of the surface of the seating portion 13.

In practicing my method of bonding the Stellite to the surface 13 in and through the apparatus shown herein, I place within the mold cavity 23, Stellite in a powdered or granular form, as indicated at 31 in Fig. 1, the mass of Stellite thus introduced extending sufficiently above the seating portion 13 to accommodate the shrinkage due to melting or fusing of all the particles into a molten mass, and the mold cavity in practice being sufficiently wider than the thickness of the machined Stellite ring to allow for the removal of external surface irregularities and possible impurities. The peripheral portion of the valve head is then heated by means of electrical current flowing through the conductors 32 and 33 and through the conductor blocks 16 and 27, the rings 25, and the rings 26 and 29 between which the valve head is clamped under pressure sufficient to insure a proper electrical contact between the ends of the last mentioned rings and the valve head.

As pointed out in my prior application, an important contributory factor to the realization of the objects of my invention is the shortness of time occupied in uniting the metal of lower melting point (as Stellite) to the metal of higher melting point, thereby ensuring the production of a weld or bond which is non-porous and which is homogeneous throughout as well as assisting in the prevention of oxidation of the surface of the seating portion 13. The amount of current necessary to be delivered through the peripheral portion of the valve head shown in the drawing in order to accomplish a satisfactory bonding of the Stellite thereto will vary with the diameter and other proportions of the head. Where a valve head of about three inches in diameter is used and the head is of the hollow sodium-cooled type, an alternating current of approximately 80,000 amps. and 3.15 volts will be effective. With a current of this strength and with an apparatus such as shown and described herein, it is possible to complete the cycle of melting the Stellite and bonding the same to the softened surface of the portion 13 of the valve body in from 12 to 18 seconds.

The apparatus shown in the drawing is designed with reference to handling such a high current and utilizing the same for rapidly and most effectively heating the surface of the seating portion of the valve head. The electrodes 26 and 29, being of a material of relatively high specific electrical resistivity and of correct dimensions, will be heated considerably by the passing of the high current through them, and their annular end portions which contact with the peripheral portion of the valve will offer a still greater resistance to the flow of current, due to the reduced areas of such contacting portions, and therefore will attain a still higher temperature, being brought to a bright white heat; and the surface of the seating portion of the valve head will be heated, not only by the current passing between the electrodes 26 and 29 and through the peripheral portion of the valve head, but also by heat conducted thereto from the extremely hot end portions of the electrodes; and the said peripheral portion as well as the Stellite in the mold cavity will also be heated by radiation from the said end portions of the electrodes. The temperature of these annular electrode end portions will probably be higher than that which would be produced in the peripheral portion of the valve head by the mere passage of the current therethrough. The surface of the seating portion of the valve head will benefit to a greater degree from the heat thus applied externally thereto from the hot end portions of the electrodes than will the interior of the metal of the valve head. The characteristic comparatively low heat conductivity of the graphite used for the electrodes will prevent the copper blocks 16 and 27 from conducting heat away from the hot end portions of the electrodes to any appreciable extent. In order to assist still further in the heating of the end portion of the lower electrode 26, the rings 25 which are interposed between the said electrode and the copper block 16 are of a carbon material having a still higher specific electrical resistivity than that of the graphite electrode material; they also increase the heat-insulation between the said electrode and the copper block 16. By varying the number and the thickness of the rings 25 as well as the contact resistance between one another and the electrode 26, their electrical and thermal effect on the said electrode may be varied.

With the parts constructed and arranged as described and assuming that the Stellite 31 has been introduced into the mold cavity 23, the current will be turned on through the conductors 32 and 33, which will result in the rapid heating of the peripheral portion of the valve head to a temperature which will bring the surface or outer skin of the portion 13 to a suitably softened condition to enable it to form a homogeneous, non-porous bond with the Stellite. Meanwhile, due to the fact that the Stellite melts at a lower temperature than that necessary to bring the surface of the seating portion 13 of the valve head to this bonding condition, the Stellite will have been melted; so that, as soon as the surface of the portion 13 has been brought to the condition suitable for forming a bond with the Stellite, the supply of current is cut off.

From the foregoing description, it will be seen that the desired result of heating the skin surface of the seating portion 13 to the desired degree and of melting the Stellite has been accomplished by concentrating the passage of current through the valve head upon the peripheral portion of the same and by enhancing the heating effect of the current upon the surface of the seating portion 13 by means of externally applied heat from the hot end portions of the electrodes.

As a modification of the process described, but wherein the same apparatus may be employed, I contemplate applying to the surface of the seating portion 13 a preformed ring 34 of Stellite of suitable shape and dimensions to enable its inner wall to make close contact with said surface, employing with said ring a mold cavity 23 of suitable shape and dimensions to accommodate therewith the outer surface of the ring and to retain the Stellite when it is melted. The manner of forming a bond between the Stellite, when thus applied, and the tapered surface of the seating portion of the valve head will be substantially the same as that employed for accomplishing this bonding effect by the use of powdered or granular Stellite. The contacting surfaces of the Stellite ring and of the seating portion 13 should, of course, be clean and, if necessary, the same can be subjected to the action of a suitable dry or fluid flux or deoxidizing agent.

Where the ring of metal of lower melting point is of considerable thickness, it may be impracticable or unnecessary to melt the same in its entirety by means of the heat employed to bring the surface or skin of the portion 13 to a condition suitable for bonding. However, a sufficient quantity of the surrounding metal adjacent to such surface or skin will have been melted to enable an efficient bond to be formed between the ring and the seating portion of the valve.

The foregoing operations can be automatically controlled in such manner that the current supplied through the electrodes and the peripheral portion of the valve body or other metal of high melting point will be automatically cut off when the surface of such peripheral portion shall have been heated to the proper temperature to enable it to form a bond with the metal of lower melting point. For instance, where the current is being supplied to the frustoconical peripheral portion of a valve body, such as shown in the drawing, after the time required for melting the Stellite and for bringing the skin of the portion 13 to the desirable temperature has been ascertained, clock mechanism can be connected up into the circuit which includes the electrode rings 26 and 29, whereby the current supplied through the said rings and the interposed peripheral portion of the valve body will be cut off at the end of this predetermined time. Because of variations which may occur in current supplied to the said electrodes, it is contemplated that an ammeter will also be included in the electrical circuit and the current adjusted in accordance with the reading of the ammeter. Furthermore, the same result may be obtained by the use of an ampere-hour, or watt-hour, meter including an adjustable stop which may be set to the ampere-hour, or watt-hour, point requisite for heating the surface 13 to the desired condition, with a friction-driven pointer which, when it engages the said contact, will operate, through a suitable auxiliary relay in a circuit including the electrode rings, to cut off the current supplied thereto and to the portion of the valve body interposed therebetween. After such engagement, the pointer can be reset to zero ready for the next heating operation. As the manner of connecting either of these time mechanisms with an auxiliary relay in the circuit including the electrode rings is well known to those skilled in the art, no detailed description or illustration of the same will be necessary.

The current may also be cut off automatically by a photo-electric cell or a thermo-couple, suitably located with respect to the mold cavity and the peripheral portion 13 of the valve body to enable them to operate, through means including an auxiliary relay, a relay for controlling the supply of current to the electrodes.

As a still further means for automatically cutting off the current by which the peripheral portion of the valve body is heated, a thermocouple, indicated at 35, can be used, the couple being inserted, for instance, within a cavity provided therefor in the mold, as shown, and being connected, through means including an auxiliary relay, with a relay for controlling the supply of current to the electrodes between which the peripheral portion of the valve body is gripped, the thermocouple being so constructed as to operate the current-controlling relay through said auxiliary relay, thereby to cut off the current when the temperature of the surface 13 shall have reached the necessary point to enable the bonding action to take place.

Having thus described my invention, what I claim is:

1. The process of providing a frustoconical peripheral portion of a metallic body with a surrounding ring of metal having a lower melting point than that of said body, said process comprising placing the metal of lower melting point, in a divided condition, within a mold surrounding and spaced from the said frustoconical peripheral portion, supplying electrical current through the said frustoconical peripheral portion of said body thereby to raise the temperature of the same to a point sufficient to melt the metal of lower melting point surrounding said portion and to render the surface of the said portion suitable for forming a bond with the molten metal in contact therewith; and cutting off the supply of current when the surface of said frustoconical peripheral portion shall have been brought to such suitable condition.

2. The process of providing a frustoconical peripheral portion of a metallic body with a surrounding ring of metal having a lower melting point than that of said body, said process comprising pre-forming a ring of such metal of lower melting point whereby it is provided with an inner surface of frustoconical shape adapted to engage the surface of the frustoconical peripheral portion of said body; placing said ring upon the frustoconical peripheral portion of said body, with the inner surface of said ring in contact with said frustoconical peripheral portion; surrounding the ring and the frustoconical peripheral portion of said body with a mold; supplying electrical current through the said frustoconical peripheral portion of said body thereby to raise the temperature of the same to a point sufficient to melt at least the portion of the ring contacting therewith and to render the surface of said frustoconical peripheral portion suitable for forming a bond with the molten metal in contact therewith; and cutting off the supply of current when the surface of said frustoconical peripheral portion shall have been brought to such suitable condition.

3. The process of providing a frustoconical peripheral portion of a metallic body with a surrounding ring of metal having a lower melting point than that of said body, said process comprising supporting the metal of lower melting point in contact with the said frustoconical peripheral portion, supplying electrical current through the said frustoconical peripheral portion of said body thereby to raise the temperature of the same to a point sufficient to melt the metal of lower melting point surrounding said portion and to render the surface of the said portion suitable for forming a bond with the molten metal in contact therewith; and cutting off the supply of current when the surface of said frustoconical peripheral portion shall have been brought to such suitable condition.

ANTONIO LONGORIA.